March 22, 1966  H. H. HOADLEY  3,241,310
LIGHTWEIGHT POWER PLANT
Filed April 5, 1957

INVENTOR
HENRY H. HOADLEY
BY Leonard F. Wakland
ATTORNEY

United States Patent Office 3,241,310
Patented Mar. 22, 1966

3,241,310
LIGHTWEIGHT POWER PLANT
Henry H. Hoadley, Manchester, Conn., assignor to United Aircraft Corporation, East Hartford, Conn., a corporation of Delaware
Filed Apr. 5, 1957, Ser. No. 650,907
6 Claims. (Cl. 60—35.6)

This invention relates to lightweight power plants of the turbine type and more specifically to a simple and compact power plant having a combined compressor and turbine intended for operation with very high energy fuels.

It is an object of this invention to provide a turbine type power plant utilizing a normally gaseous fuel in a liquid state with means for preheating the fuel and utilizing the energy of the expanding fuel to drive a turbine which is built into a single compressor stage. The means for preheating the fuel comprises a heat exchanger which keeps the exhaust duct sufficiently cool so that higher internal temperatures can be attained than in present day turbojets.

It is a further object of this invention to provide a power plant of the type described including flameholders which act as supporting struts for an inner body of the power plant and also act as conduits to lead gaseous fuel to the turbine.

A still further object of this invention is to support the compressor on forwardly mounted bearings such that the bearings are located in the upstream or cool region of the power plant.

These and other objects of this invention will become readily apparent from the following detailed description of the drawing in which.

Figure 1:
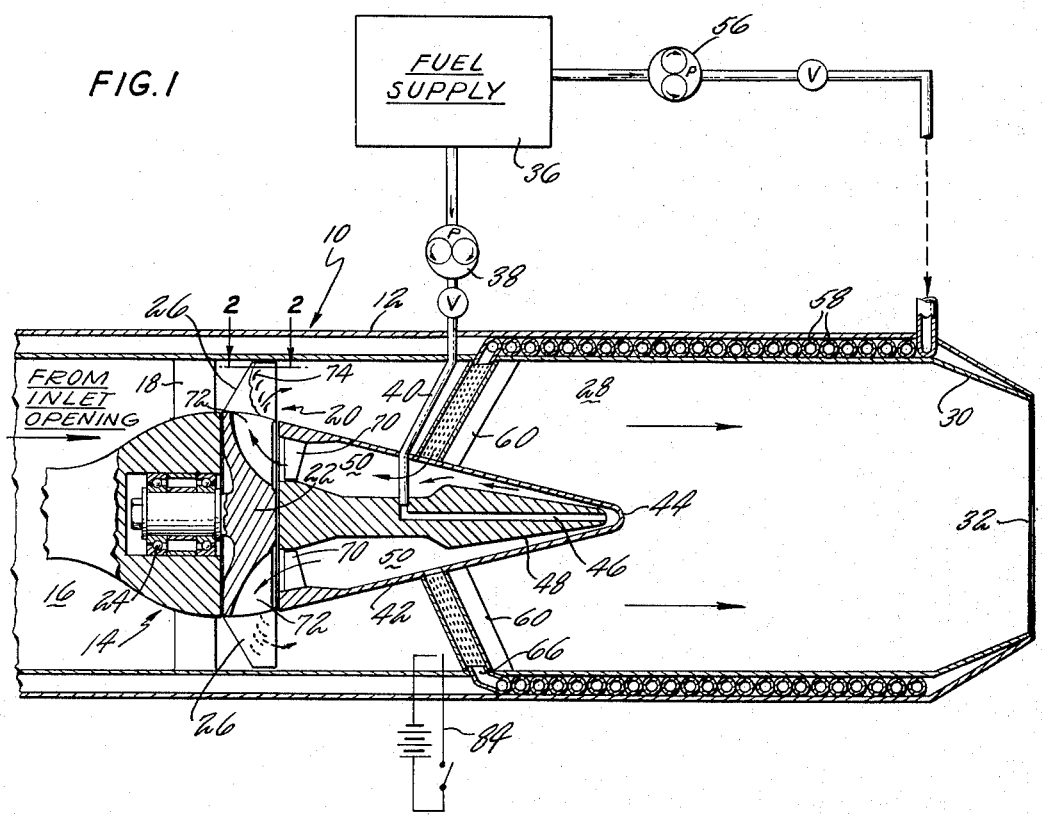
FIG. 1 is a schematic illustration of a portion of the power plant.

Referring to FIG. 1, a power plant is generally indicated at 10 as having an outer casing 12 and an inner body generally indicated at 14. The outer casing 12 and the inner body 14 between them define an annular passage into which air enters from an air inlet 16. Fixed or variable turning vanes 18 may be provided just upstream of the compressor generally indicated at 20. The compressor includes a rotor 22 which is mounted in a suitable bearing 24. The bearing 24 being mounted upstream of the compressor and the combustion chamber and thus remains in a cool region thereby avoiding the problems involved with high temperatures. The compressor 20 has a plurality of hollow blades 26 peripherally disposed around the rotor 22 and is intended to compress the air passing to the combustion chamber 28. The combustion chamber 28 may be a primary combustion chamber or it may comprise an afterburner type of combustion chamber. The gases from the combustion chamber 28 are emitted by an exhaust nozzle 30 which terminates in an opening 32.

A source of fuel 36 is provided. The fuel may be any fuel which can be stored in a liquid state, such as hydrogen, so that some of the energy of the fuel in passing from a liquid to a gaseous condition can be utilized to provide power for driving the compressor. There are two reasons for utilizing a liquid fuel of the type described which fuel in a liquid state is at low temperatures. One is to cool the burner walls thereby allowing burning at the high temperatures associated with high energy and the high Mach number. Two, the gasified fuel can be expanded through the reaction turbine thereby accomplishing the compression work. A relatively small amount of fuel is pumped by the pump 38 to a line 40 which leads to the central part of the aft portion 42 of the inner body 14. The aft portion 42 is of conical shape and tapers in a downstream direction and terminates in a trailing edge 44 of relatively small diameter. The line 40 leads to a central axially extending passageway 46 which conducts the fuel to the aft end 44 of the inner body causing it then to circulate in an upstream direction in the passage 48 and into the annular manifold 50 thereby providing cooling for the tail cone.

Figure 3:
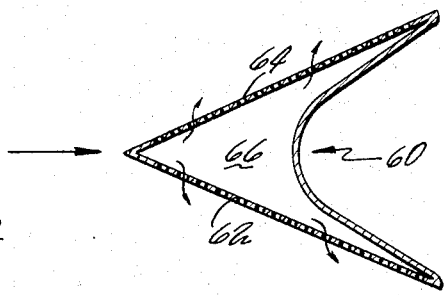
FIG. 3 is a cross-sectional illustration of the flameholders of FIG. 1.

The pump 56 pumps a relatively large supply of fuel to the coils 58 comprising a heat exchanger which surrounds the combustion chamber 28 and extends substantially aft to the nozzle 30. The heat exchanger coils 58 cool the walls of the combustion chamber and exhaust nozzle and at the same time heat the fuel. The fuel is then conducted through the hollow V-type flameholders 60 which double as supporting struts for the inner body 14. The V-shaped flameholders are shown in cross section in FIG. 3 and may have walls 62 and 64 which are perforated. In this manner a part of the fuel passing through the hollow passage 66 as a gas may be emitted through the perforations to thereby control the boundary layer on the flameholders. The concept of this type of flameholder boundary layer control is fully described and claimed in application Serial No. 568,550 filed February 29, 1956, now Patent No. 2,912,825, by Arthur W. Blackman et al.

Figure 2:
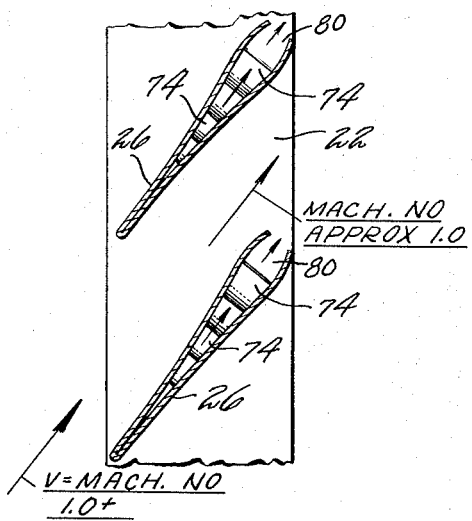
FIG. 2 is a cross-sectional illustration of the turbine compressor blading taken along the line 2—2 of FIG. 1.

Thus, the fuel passing through the passage 66 not only may cool the flameholders 60 but a part of this fuel may be emitted to control the boundary layer to provide more stable flame propagation and permit use of smaller flameholders. Fuel from the hollow passage 66 also flows into the fuel manifold 50 in the central body 14. The upstream end of the manifold 50 includes a plurality of vanes 70 which may form prerotation nozzles therebetween to direct the gaseous fuel radially through the passages 72 in the compressor rotor 22. The fuel then passes through the turning or reaction vanes 74 which are located within the hollow compressor blades 26. These compressor blades are better seen in FIG. 2. Thus, the turning or reaction vanes 74 comprise a reaction or impulse turbine. The fuel is then emitted from spanwise openings 80 in the trailing edge of the blades which, because of these openings 80, causes the trailing edge of the blades to be substantially blunt.

The high velocity fuel is then ignited by any suitable igniting means 84 adjacent the flameholder 60. A subsequent rise in temperature and pressure causes the hot gases to be emitted from the exhaust nozzle 32 to provide the necessary high thrust. As a result of this invention it is apparent that a most simple arrangement of a combined single stage compressor with an internal turbine has been provided. The passages between the compressor blades provide isentropic pressure recovery from the supersonic relative approach velocity to a Mach number of about 1.0 at the trailing edge of the compressor blades 26. As a result of the blunt trailing edge there is then provided the space for a two-dimensional hydrogen fuel nozzle at the openings 80 (see FIG. 2). This same configuration permits the turbine to be air cooled since the air passing over the compressor blades provides some cooling effect to the walls of the turbine which is contained within each of the compressor blades.

Furthermore as a result of this invention, extremely good mixing will occur between the hydrogen fuel and the air. Since most of the hydrogen fuel will pass through the turbine and out through the trailing edge of the compressor blades, there is no need for fuel-spray bars. It is well known that fuel-spray bars produce a considerable amount of drag and blockage in present day high output turbine plants. Furthermore, since the turbine gets its power from jet thrust rather than shaft torque, the angular momentum of the hydrogen will be equal and opposite to that of the air leaving the compressor; thus, after the mixing process no rotation will remain and no stator vanes are necessary.

In addition as a result of the particular compressor turbine configuration there are several distinct advantages. The configuration is compact and lightweight. The geometry of the blades (cross section) results in high blade stiffness, i.e., the blades are short and blunt in a chordwise direction. The blade configuration provides readily for properly designing for supersonic compressor operation. The turbine is maintained relatively cool at no penalty in performance.

Although only one embodiment of this invention has been illustrated and described herein, it will become readily apparent that various changes and modifications may be made in the construction and arrangement of the various parts without departing from the scope of this novel concept.

What is desired by Letters Patent is:

1. In a power plant having an air inlet, an axial flow compressor receiving air from said inlet, a combustion chamber, and an exhaust nozzle terminating in an exhaust opening, a streamlined inner body located in said power plant, said compressor comprising a plurality of hollow blades, a source of fuel under pressure, means for conducting fuel from said source to said inner body, means for conducting fuel from said inner body radially through said hollow blades, turning vanes in said blades and spaced along the span thereof for turning the radial flow of fuel from said radial direction in a direction axially of said power plant, means for discharging said fuel at high velocity from the trailing edge of said blades and substantially throughout the span thereof to drive said blades for rotation about the power plant axis thereby providing a reaction turbine, said discharging means comprising a substantially wide slot forming the trailing edge of the blades, hollow flameholder means downstream of said compressor and extending radially across said combustion chamber to said center body, and means for further discharging fuel from the upstream surface of said flameholder means directly into said combustion chamber, said upstream surface diverging rearwardly and being a major portion of the surface of said flameholder means.

2. In a power plant having an air inlet, an axial flow compressor downstream of said inlet, a combustion chamber receiving air from said compressor, and an exhaust nozzle terminating in an exhaust opening, a streamlined inner body located in said power plant, said compressor comprising a plurality of hollow blades, a source of fuel under pressure, means for conducting fuel from said source to said inner body, means in heat exchange relation with said combustion chamber and conducting fuel through said inner body, means for conducting fuel from said inner body radially through said hollow blades, means for discharging said fuel at high velocity from the trailing edge of said blades including an opening extending along a majority of the span of said blades thereby to drive said blades for rotation about the power plant axis, hollow flameholder means downstream of said compressor and extending radially across said combustion chamber, means for conducting fuel from said source internally of said flameholders including a heat exchanger surrounding said combustion chamber, passage means in the upstream surface of said flameholder means for expelling a portion of the fuel from inside thereof into said combustion chamber, said upstream surface diverging rearwardly and being a major portion of the surface of said flameholder means, and means for conducting fuel from inside said flameholder means into said inner body.

3. In a power plant having an air inlet, a central body downstream of said inlet, a casing radially spaced from said body and therebetween forming an annular passage, an axial flow compressor receiving air from said inlet and carried by said inner body, said compressor including a plurality of peripherally spaced blades spanning said annular passage, said inner body terminating in a trailing edge of relatively small diameter, a combustion chamber, a plurality of hollow flameholders spanning the annular passage and connected to said casing and to said inner body at an axial location between said compressor and said inner body trailing edge, a source of fuel under pressure, means for conducting fuel from said source directly to said inner body for circulation in the aft end thereof, a heat exchanger surrounding said combustion chamber, a second means for conducting fuel from said source through said heat exchanger, means for conducting fuel from said heat exchanger directly into said flameholders and then into said inner body, the major portion of the surface of said flameholders facing and converging in an upstream direction, said major portion having means for injecting fuel into said combustion chamber passages in said compressor blading for receiving fuel from said inner body, reaction turbine vanes in said compressor blades adapted to be driven by said fuel, spanwise openings in the trailing edge of said compressor blades for discharging fuel therefrom, and means for burning said fuel in said combustion chamber.

4. In a power plant having an air inlet, a central body downstream of said inlet, a casing radially spaced from said body and therebetween forming an annular passage, an axial flow compressor receiving air from said inlet and carried by said inner body, said compressor including a plurality of peripherally spaced blades spanning said annular passage, said inner body having its aft portion conical shape and terminating in a trailing edge of relatively small diameter, a combustion chamber, a plurality of V-shaped hollow flameholders spanning the annular passage and connected to said casing and to said inner body at an axial location between said compressor and said inner body trailing edge, a source of fuel under pressure, means for conducting fuel from said source directly to said inner body for circulation in the aft end thereof, a heat exchanger adjacent said combustion chamber, a second means for conducting fuel from said source through said heat exchanger, means for conducting fuel from said heat exchanger into said flameholders and then into said inner body, means for circulating fuel in said aft portion of said inner body in an upstream direction, passages in said compressor blading for receiving fuel from said inner body, reaction turbine vanes in said compressor blades adapted to be driven by said fuel, spanwise openings in the trailing edge of said compressor blades for discharging fuel therefrom, said spanwise openings causing said compressor blades to have a blunt trailing edge, and means for burning said fuel in said combustion chamber.

5. In a power plant having an air inlet, a central body downstream of said inlet, a casing radially spaced from said body and therebetween forming an annular passage, an axial flow compressor receiving air from said inlet and carried by said inner body, said compressor including a plurality of peripherally spaced blades spanning said annular passage, said inner body having its aft portion conical shape and terminating in a trailing edge of relatively small diameter, a combustion chamber, a plurality of V-shaped hollow flameholders spanning the annular passage and connected to said casing and to said inner body at an axial location between said compressor and said trailing edge, a source of fuel under pressure, means for conducting fuel from said source directly to said inner body for circulation in the aft end thereof, a heat exchanger adjacent said combustion chamber, a second means for conducting fuel from said source through said heat exchanger, means for conducting fuel from said heat exchanger into said flameholders and then into said inner body, means for circulating fuel in said aft portion of said inner body in an upstream direction, prerotation nozzles adjacent the upstream end of said inner body and receiving fuel therefrom, passages in said compressor blading for receiving fuel from said nozzles, reaction turbine vanes in said compressor blades adapted to be driven by said fuel, spanwise openings in the trailing edge of said compressor blades for discharging fuel therefrom, said spanwise openings causing said compressor blades to have a blunt trailing edge, and means for burning said fuel in said combustion chamber.

6. In a power plant having an air inlet, a central body downstream of said inlet, a casing radially spaced from said body and therebetween forming an annular passage, an axial flow compressor receiving air from said inlet and carried by said inner body, said compressor including a plurality of peripherally spaced blades spanning said annular passage, stator vanes upstream of said compressor blades, said inner body having its aft portion conical shape and terminating in a trailing edge of relatively small diameter, a combustion chamber, a plurality of V-shaped hollow flameholders spanning the annular passage and mounted to said casing and to said inner body at an axial location between said compressor and said inner body trailing edge, a source of fuel under pressure, means for conducting fuel from said source directly to said inner body for circulation therein, a heat exchanger receiving heat from said combustion chamber, a second means for conducting fuel from said source through said heat exchanger, means for conducting fuel from said heat exchanger into said flameholders and then into said inner body, passages in the V surfaces of said flameholders for discharging a part of the fuel passing inside said flameholders, means for circulating fuel in said aft portion of said inner body in an upstream direction, passages in said compressor blading for receiving fuel from said inner body, reaction turbine vanes in said compressor blades adapted to be driven by said fuel, spanwise openings in the trailing edge of said compressor blades for discharging fuel therefrom, said spanwise openings causing said compressor blades to have a blunt trailing edge, and means for burning said fuel in said combustion chamber including ignition means adjacent said flameholders.

References Cited by the Examiner
UNITED STATES PATENTS

| | | | |
|---|---|---|---|
| 2,483,045 | 9/1949 | Harby | 60—35.6 |
| 2,592,938 | 4/1952 | McNaught | 60—35.6 |
| 2,611,241 | 9/1952 | Schulz | 230—116 |
| 2,620,625 | 12/1952 | Phaneuf | 60—35.6 |
| 2,823,516 | 2/1958 | Schelp | 60—35.6 |
| 3,000,176 | 9/1961 | Kuhrt | 60—35.6 |

MARK NEWMAN, *Primary Examiner.*

SAMUEL FEINBERG, SAMUEL BOYD, *Examiners.*

D. HART, *Assistant Examiner.*